United States Patent
Dämon et al.

(10) Patent No.: US 9,634,362 B2
(45) Date of Patent: Apr. 25, 2017

(54) SAFETY DEVICE FOR A VEHICLE AND METHOD FOR CONTROLLING THE SAME

(71) Applicant: SAMSUNG SDI CO., LTD., Yongin-si, Gyeonggi-do (KR)

(72) Inventors: Peter Dämon, Laßnitzhöhe (AT); Thomas Trathnigg, Graz (AT)

(73) Assignee: Samsung SDI Co., Ltd., Yongin-si (KR)

( * ) Notice: Subject to any disclaimer, the term of this patent is extended or adjusted under 35 U.S.C. 154(b) by 242 days.

(21) Appl. No.: 14/085,990

(22) Filed: Nov. 21, 2013

(65) Prior Publication Data

US 2014/0154537 A1    Jun. 5, 2014

(30) Foreign Application Priority Data

Nov. 30, 2012    (EP) .................................... 12195073

(51) Int. Cl.
*H01M 10/63*    (2014.01)
*B60L 3/00*    (2006.01)
(Continued)

(52) U.S. Cl.
CPC ......... *H01M 10/502* (2013.01); *B60L 3/0046* (2013.01); *B60L 3/0069* (2013.01);
(Continued)

(58) Field of Classification Search
None
See application file for complete search history.

(56) References Cited

U.S. PATENT DOCUMENTS 6,546,742 B1 * 4/2003 Ota .................... B60H 1/3208
                                                      62/133
2007/0013382 A1    1/2007 Doenitz et al.
(Continued)

FOREIGN PATENT DOCUMENTS

CN    101324645 A    12/2008
CN    102470758 A     5/2012
(Continued)

OTHER PUBLICATIONS

SIPO Office action dated Nov. 3, 2015, with English translation, for corresponding Chinese Patent application 201310618757.2, (13 pages).
(Continued)

*Primary Examiner* — Miriam Stagg
*Assistant Examiner* — Carmen Lyles-Irving
(74) *Attorney, Agent, or Firm* — Lewis Roca Rothgerber Christie LLP

(57) ABSTRACT

A safety device for a vehicle having a battery system with a plurality of battery cells, a method for controlling the safety device, and a system that includes the safety device and the battery system. The safety device includes an electronic unit; a first device configured to detect an insulation resistance between components of the battery system and a reference potential, which components are connected in an electrically conductive manner to at least one battery cell; a second device configured to supply and/or discharge heat to and/or from the battery cells via a heat transfer medium which circulates in at least one circular flow pattern; and at least a first cut-off valve configured to interrupt the circular flow path of the heat transfer medium and which is actuated by the electronic unit from an open position into a closed position when the detected insulation resistance is below a predetermined limit value.

18 Claims, 4 Drawing Sheets

(51) Int. Cl.
  *B60L 3/04*    (2006.01)
  *B60L 11/18*   (2006.01)
  *H01M 10/625*  (2014.01)
  *H01M 10/6568* (2014.01)

(52) U.S. Cl.
  CPC .............. *B60L 3/04* (2013.01); *B60L 11/1864* (2013.01); *B60L 11/1874* (2013.01); *B60L 11/1875* (2013.01); *B60L 11/1877* (2013.01); *H01M 10/625* (2015.04); *H01M 10/63* (2015.04); *H01M 10/6568* (2015.04); *B60L 2200/26* (2013.01); *B60L 2240/547* (2013.01); *H01M 2200/00* (2013.01); *Y02T 10/7005* (2013.01); *Y02T 10/7061* (2013.01)

(56) References Cited

U.S. PATENT DOCUMENTS

| | | | |
|---|---|---|---|
| 2008/0110189 A1* | 5/2008 | Alston | B60H 1/00428 62/236 |
| 2011/0049977 A1 | 3/2011 | Onnerud et al. | |
| 2011/0119004 A1 | 5/2011 | Liu | |
| 2011/0148361 A1 | 6/2011 | Yokotani | |
| 2012/0159986 A1 | 6/2012 | Imanishi et al. | |
| 2012/0256611 A1 | 10/2012 | Fukui et al. | |
| 2012/0316712 A1* | 12/2012 | Simonini | H01M 10/625 701/22 |

FOREIGN PATENT DOCUMENTS

| | | |
|---|---|---|
| DE | 102010051002 A1 | 5/2012 |
| DE | 102011116968 A1 | 5/2012 |
| JP | 2011-135657 A | 7/2011 |
| JP | 2012-110175 A | 6/2012 |
| WO | 2010028692 A1 | 3/2010 |
| WO | 2012030455 A2 | 3/2012 |

OTHER PUBLICATIONS

SIPO Office action dated Jun. 14, 2016, with English translation, for corresponding Chinese Patent application 201310618757.2 (17 pages).

* cited by examiner

SAFETY DEVICE FOR A VEHICLE AND METHOD FOR CONTROLLING THE SAME

CROSS-REFERENCE TO RELATED APPLICATIONS

The present application claims priority 35 U.S.C. §119 to European Patent Publication No. EP 12195073.7 (filed on Nov. 30, 2012), which is hereby incorporated by reference in its entirety.

TECHNICAL FIELD

The present invention relates to a safety device for a vehicle and to a method for controlling a safety device.

BACKGROUND

A device of the generic type is disclosed in German Patent Publication No. DE 10 2010 051 002 A1, which discloses a high voltage battery that comprises a housing and a device for guiding a cooling medium that are arranged in the housing. A valve device for influencing the flow of the cooling medium is arranged in the interior of the housing. The valve device may be adjusted by way of a magnetic or a mechanical drive.

A method of the generic type is disclosed in German Patent Publication No DE 10 2011 116 968 A1 in order to ascertain the presence of a cooling medium leak. In accordance with the method, capacities of the battery are ascertained with regard to a discharge current and are compared with each other and on the basis of this comparison conclusions are drawn regarding cooling medium loss.

The conventional solutions do not provide any indication as to what is to occur in the event of a cooling medium leak beyond the mere information and display. It is possible for short circuits to occur inside the battery system when using an electrically conductive cooling medium. If any component of the battery system that is carrying high voltage comes into contact with the cooling medium leak, an electrolysis of the cooling medium occurs which is associated with a large generation of heat and formation of steam inside the battery system. The battery system may be considerably damaged as a result of effects of this type.

SUMMARY

Embodiments relate to enhanced safety devices for vehicles having battery systems and a method thereof which reduce the negative effects of cooling medium loss inside the battery system.

In accordance with embodiments, a safety device for a vehicle that includes a battery system having a plurality of battery cells and an electronic unit, the safety device including least one of: a device for ascertaining an insulation resistance between components of the battery system and a reference potential, which components are connected in an electrically conductive manner to at least one battery cell; and a device configured to supply and/or discharge heat to and/or from the cells by way of a liquid heat transfer medium and also at least a first cut-off valve, wherein the heat transfer medium may circulate in at least one circular flow, and the circular flow may be interrupted by way of the first cut-off valve, wherein the electronic unit is configured for the purpose of actuating the first cut-off valve from an open position into a closed position if it is recognized that the magnitude of the insulation resistance is below a predetermined limit value.

In accordance with embodiments, a method for controlling a safety device for a vehicle having a battery system, the method including at least one of: at least intermittently detecting an insulation resistance between components of the battery system and a reference potential, which components are connected in an electrically conductive manner to at least one battery cell, evaluating, using an electronic unit, the electrical insulation resistance that is ascertained by the device for at least intermittently detecting the electrical insulation resistance, and controlling, by way of the electronic unit, the first cut-off valve using the results of the evaluation.

In accordance with embodiments, if it is detected that the magnitude of the insulation resistance is below a predetermined limit value, the cut-off valve is actuated in such a manner that the circular flow is interrupted. If a leak of the heat transfer medium occurs, and if the heat transfer medium is electrically conductive, then the leak may cause an electrically conductive connection between a component of the battery system, which component is connected in an electrically conductive manner to at least one cell, and a reference potential that is galvanically separated from the at least one cell. Components of the battery system that are connected in an electrically conductive manner to the cells are, for example, cell connectors, cell housing, cell voltage taps that are connected to the cell terminals or to the cell connectors, and further components of a high voltage current circuit. Components of the electronic unit are also connected to the cells in an electrically conductive manner by way of the cell voltage taps.

In accordance with embodiments, an electrically conductive connection of this type is recognized extremely quickly by way of the device for detecting or otherwise ascertaining the insulation resistance. Consequently, the quantity of heat transfer medium being discharged may be considerably reduced by way of interrupting the circular flow via the first cut-off valve. Any further damage to the battery system is efficiently prevented as a result.

In accordance with embodiments, the circular flow is an open circular flow having a feed flow connection and a return flow connection. The term "open circular flow" is understood in this case to mean a circular flow that is not closed inside the battery system. Accordingly, sections of the entire closed circular flow are arranged outside the battery system, for example, a circulation pump for circulating the heat transfer medium or a heat exchange for supplying and/or discharging heat to and/or from the heat transfer medium to the environment or also a reservoir for the heat transfer medium. Accordingly, the battery system includes at least two interfaces at which the section of the circular flow outside the battery system is connected to the section that is inside the battery system. One of these interfaces forms the feed flow connection; the other interface forms the return flow connection. The feed flow connection and the return flow connection are mainly arranged in the outer battery housing. Alternatively thereto, the feed flow connection and the return flow connection are components of a cooling body, wherein in this case the cooling body forms a section of the outer housing.

If a leak of the heat transfer medium occurs, then it is expedient to adjust the operation of the circulation pump in order to avoid any additional heat transfer medium being conveyed to the leak site. This functionality cannot be guaranteed particularly in the event of an accident. By virtue of arranging a first cut-off valve between the circulation pump and the section of the circular flow that is allocated to the battery system, it is reliably prevented that any additional heat medium transfer is conveyed to the site of the leak.

When the entire circular flow is suitably configured, it is possible for heat transfer medium to flow out of the reservoir towards the leak site in the section of the circular flow that is allocated to the battery system. This effect is counteracted by virtue of arranging a first cut-off valve between the reservoir and the section of the circular flow that is allocated to the battery system.

In accordance with embodiments, a first cut-off valve and a second cut-off valve may be arranged in the circular flow between the feed flow connection and the return flow connection. This arrangement advantageously ensures, in the event of a leak occurring inside the battery system, that it is not possible for the heat transfer medium to continue to flow through either the circulation pump or from the reservoir towards the site of the leak.

In accordance with embodiments, the first and/or the second cut-off valve may be arranged inside the section of the circular flow that is allocated to the battery system. This is advantageous in so far as the device for ascertaining the insulation resistance is likewise a component of the battery system. As a consequence, the process of assembling the battery system is made considerably easier, since, for example, it is not necessary to route separate lines to the cut-off valves that are arranged outside the battery system. In addition, this arrangement further enhances the safety and reliability, since communication with cut-off valves that are arranged outside the battery system may be impaired in the event of an accident.

In accordance with embodiments, if the feed flow connection and the return flow connection are arranged in close spacial proximity to each other, it is expedient if these cut-off valves comprise a common actuating device. Alternatively, separate actuating devices are also feasible.

In accordance with embodiments, the first and the second cut-off valve may be arranged outside a section of the outer housing. If a leak occurs at the feed flow connection or at the return flow connection, then this arrangement advantageously prevents the heat transfer medium from passing from the section of the circular flow outside the battery system into the interior of the housing.

In accordance with embodiments, the device configured to supply and/or discharge heat may include at least one cooling body having a heat transfer medium inlet and a heat transfer medium outlet, wherein the first cut-off valve is arranged in the region of the heat transfer medium inlet and the second cut-off valve is arranged in the region of the heat transfer medium outlet.

If the heat transfer medium inlet and the heat transfer medium outlet are arranged in spatial proximity to each other, it is advantageous if the first cut-off valve and the second cut-off valve comprise a common actuating device. Alternatively thereto, a separate actuating device for each cut-off valve is also feasible.

In accordance with embodiments, the battery system may also comprise a plurality of cooling bodies that are arranged in the circular flow in series and/or in parallel. A cooling body and the cells that are allocated to the cooling body are also described as a battery module, which thus forms a structural sub-unit of a battery system.

In accordance with embodiments, if the battery system comprises more than one battery module, and consequently more than one cooling body, then it is advantageous that a first and/or a second cut-off valve is not allocated to each cooling body. The cut-off valve must fulfil its functionality requirements in a safe and reliable manner for the duration of the serviceable life of the battery system and is to be configured accordingly. An arrangement of cut-off valves at each battery module would considerably increase the costs of the battery system, particularly in the case of a high number of battery modules. Consequently, it is expedient to implement measures by way of which any leak of a predefined quantity of heat transfer medium does not influence the safety and reliability of the battery system. For example, devices for absorbing or dissipating any leaking heat transfer medium may be provided in the battery system. As a consequence, the number of required cut-off valves may be reduced. For applications where safety and reliability are of the essence, for example for mine vehicles used in underground mining or for rail-borne vehicles, cut-off valves may also be arranged on each cooling body in order to increase safety and reliability.

In accordance with embodiments, the cut-off valve(s) may comprise(s) an electromagnetic actuating device that is configured in such a manner that the cut-off valve automatically assumes a closed position as soon as the mean magnitude of the current that is flowing through the electromagnetic actuating device is below a predetermined limit value. The cut-off valve may assume the closed position automatically, for example, by way of a bias mechanism (e.g., spring) that urges an armature of the electromagnetic actuating device in the direction towards a closed position. Accordingly, in order to maintain an open position of the cut-off valve, it is necessary for current to flow through the electromagnetic actuating device. This current flow, in accordance with embodiments, may be in the form of a pulse width-modulated current flow, since in this manner the power consumption of the electromagnetic actuating device is reduced. This embodiment advantageously ensures intrinsic safety and reliability so that the cut-off valve assumes the closed position even in the event of a malfunction of the electronic unit.

In accordance with embodiments, the device configured to ascertain the insulation resistance is a component of the electronic unit. The electronic unit is configured for the purpose of ascertaining and evaluating parameters, for example, voltage and charging/discharging current in the high voltage current circuit. For the purpose of communicating with other systems of the vehicle, the electronic unit also comprises connections to reference potential that is galvanically separated from the high voltage circuit of the battery system, the reference potential being, for example, the earth potential of the vehicle. The battery system is therefore simplified by way of the device for ascertaining the electrical insulation resistance being integrated in the electronic unit, since the potentials that are to be compared are available in spatial proximity inside a component of the battery system.

In accordance with embodiments, a water-glycol mixture may be used as the heat transfer medium. Water-glycol mixtures have good heat conducting properties and are a good basis in the automotive industry for liquid heat transfer media, for example for the cooling system in an internal combustion engine. Above all, maintenance costs of the vehicle may be reduced by using a widespread heat transfer medium of this type.

In accordance with embodiments, a method for controlling a battery system is provided, the method including at least one of: at least intermittently detecting an insulation resistance between components of the battery system and a reference potential, which components are connected in an electrically conductive manner to at least one cell; evaluating the electrical insulation resistance that is ascertained by the device for checking the electrical insulation resistance, and then controlling the first and/or the second cut-off valve using the results of the evaluation, wherein the evaluating and controlling is conducted by an electronic unit of the battery system.

In accordance with embodiments, "intermittently detecting the insulation resistance" is understood to mean here that a regular check is performed at a cycle period of approximately 100 ms. By virtue of the fact that checks are performed intermittently, it is guaranteed that any reduction in the insulation resistance is recognized extremely quickly.

In accordance with embodiments, the method additionally may also include controlling the first and/or the second cut-off valve in such a manner that the cut-off valve is moved to a closed position in the event that the evaluation of the insulation resistance establishes that the insulation resistance is below a predetermined limit value.

Various causes may be the reason that the insulation resistance is below a predetermined limit value and the drop in insulation resistance is not necessarily as a result of a leak of the heat transfer medium. In the event, however, that the insulation resistance is below the predetermined limit value, it is usual to separate the electrical connection between the battery system and its consumers by way of a suitable device. As a consequence, the current circuit between the consumer and the battery system is interrupted. Consequently, an interruption in the circular flow does not represent an essential operational limitation, since owing to the lack of current through-flow the cells no longer supply or discharge heat to or from the consumer.

In accordance with embodiments, tests have shown that the smallest quantities of leaking heat transfer medium are sufficient to considerably reduce the insulation resistance. Even if drops are only formed on an interface inside the circular flow and the drops come to lie only at one site, as a consequence of which insulation errors are not caused directly, it is possible in a further sequence to embody a leakage distance by way of the electrical conductivity of the heat transfer medium. By way of example, drops of the heat transfer medium that are being discharged from the heat transfer medium inlet of the cooling body may pass into the gap between the cooling body and the cells. As a consequence, a leakage distance may exist between the metal housing of a cell and the cooling body, which reduces the leakage flow. This leakage flow reduces the insulation resistance and consequently may be detected by way of the device for ascertaining the insulation resistance.

In accordance with embodiments, a safety device for a vehicle having a battery system with a plurality of battery cells, the safety device includes at least one of: an electronic unit; a device configured to detect an insulation resistance between components of the battery system and a reference potential, which components are connected in an electrically conductive manner to at least one battery cell; a device configured to supply and/or discharge heat to and/or from the battery cells via a heat transfer medium which circulates in at least one circular flow pattern; and at least a first cut-off valve configured to interrupt the circular flow path of the heat transfer medium and which is actuated by the electronic unit from an open position into a closed position when the detected insulation resistance is below a predetermined limit value.

In accordance with embodiments, provided is a method for controlling a safety device of a vehicle having a battery system with a plurality of battery cells, the method including at least one of: at least intermittently detecting an electrical insulation resistance between components of the battery system and a reference potential, which components are connected in an electrically conductive manner to at least one cell; supplying and/or discharging heat to and/or from battery cells of the battery system via a heat transfer medium; evaluating the detected electrical insulation resistance; and then controlling, using the results of the evaluation, a cut-off valve configured to interrupt a flow path of the heat transfer medium.

In accordance with embodiments, a system includes at least one of: a battery system including a plurality of battery cells; and a safety device for the battery system, the safety device including an electronic unit; a first device configured to detect an insulation resistance between components of the battery system and a reference potential, which components are connected in an electrically conductive manner to at least one battery cell; a second device configured to supply and/or discharge heat to and/or from the battery cells via a heat transfer medium which circulates in at least one circular flow pattern; and at least a first cut-off valve configured to interrupt the circular flow path of the heat transfer medium and which is actuated by the electronic unit from an open position into a closed position when the detected insulation resistance is below a predetermined limit value.

DRAWINGS

Embodiments will be illustrated by way of example in the drawings and explained in the description below:

DESCRIPTION

Figure 1:
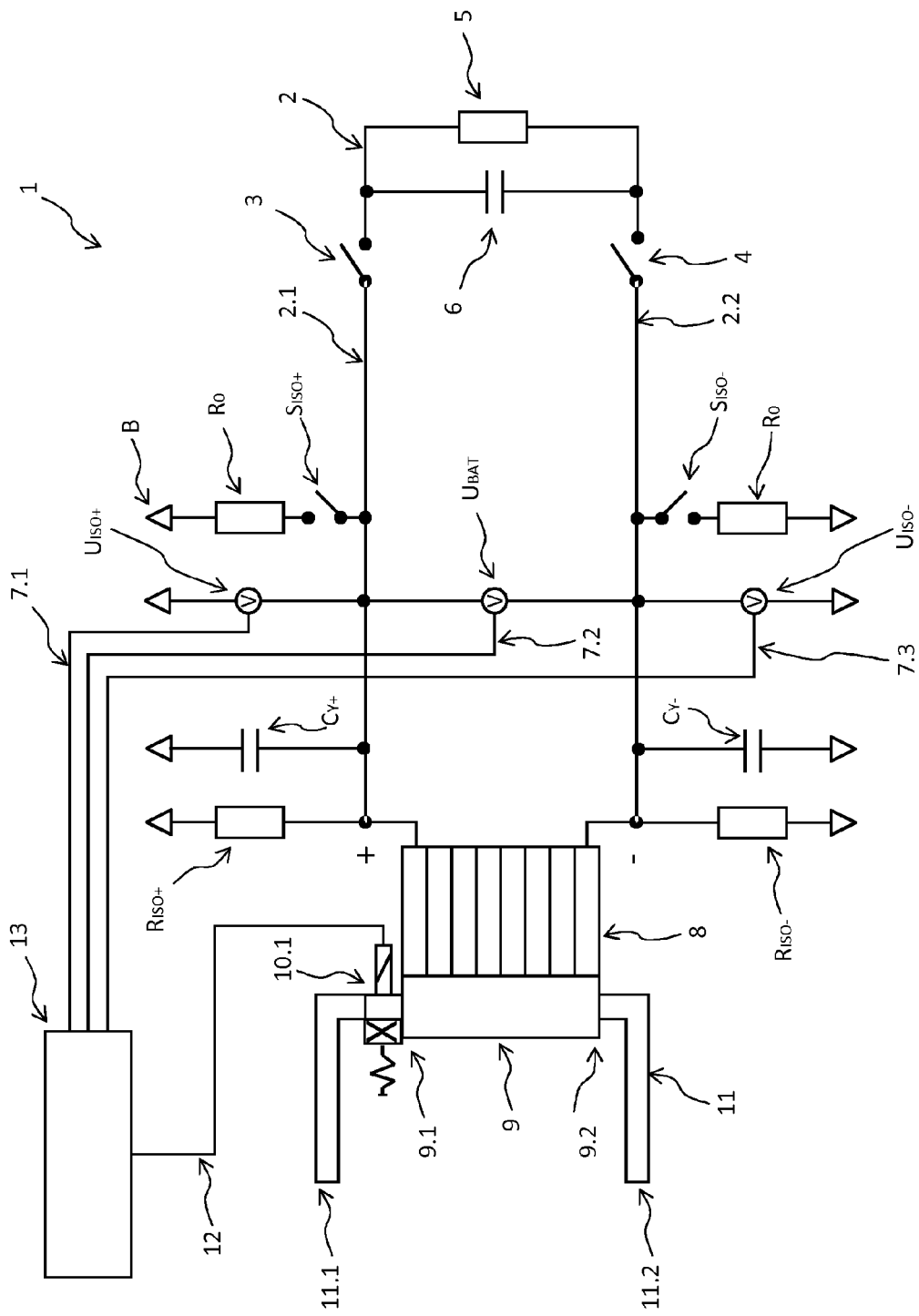
FIG. 1 illustrates a view of a safety device in accordance with embodiments.

As illustrated in FIG. 1, embodiments relate to a device 1 having a plurality of in series and/or in parallel connected battery cells 8 connected in an electrically conductive manner by way of a high voltage current circuit 2 to a load resistance 5 and a load capacitance 6. The high voltage circuit 2 comprises a positive path 2.1 and a negative path 2.2. A first separating device 3 is arranged in the positive path 2.1 and a second separating device 4 is arranged in the negative path 2.2. The high voltage current circuit 2 may be interrupted by way of the first and/or the second separating devices 3, 4.

The cells 8 may be connected to a cooling body 9 in an efficient thermally conductive manner. A liquid heat transfer medium flows through the cooling body 9 and the cooling body is thus a component of a circular flow 11. The circular flow 11 is represented in this case as an open circular flow. For the sake of clarity, some components of the circular flow 11 are therefore not illustrated in the figure, the components include, for example, a circulation pump configured to circulate the heat transfer medium or a heat exchanger configured to supply and/or discharge heat to and/or from the heat transfer medium to the environment or also a reservoir for the heat transfer medium. These components may be arranged outside the battery system, or alternatively, inside the battery system. The battery system comprises a feed flow connection 11.1 and a return flow connection 11.2 for the purpose of connecting the components of the circular flow 11 that are arranged outside the battery system. The cooling body 9 likewise comprises a heat transfer medium inlet 9.1 and a heat transfer medium outlet 9.2.

A first cut-off valve 10.1 may be arranged between the heat transfer medium inlet 9.1 and the feed flow connection 11.1 of the circular flow 11. Alternatively thereto, the first cut-off valve 10.1 may also be arranged between the heat transfer medium outlet 9.2 and the return flow connection 11.2 or at another site in the circular flow 11 between the feed flow connection 11.1 and the return flow connection 11.2. The first cut-off valve 10.1 comprises two operating positions, namely a closed position and an open position. In the closed position, the circulation flow 11 is interrupted by way of the first cut-off valve 10.1 so that the heat transfer medium may not flow through the first cut-off valve 10.1. In the open position, the heat transfer medium may flow through the first cut-off valve 10.1. The first cut-off valve 10.1 is electromagnetically actuated, wherein the electromagnet acts against a bias mechanism such as, for example, a spring. The spring is configured to cause the first cut-off valve 10.1 to assume the closed position automatically unless the current flowing through the electromagnet overcomes the force of the spring. If the first cut-off valve 10.1 is to assume the open position, then it is necessary for the electromagnet to be influenced with sufficient electrical current. Alternatively thereto, it is also feasible to embody the first cut-off valve 10.1 in such a manner that as a result of the resilient force it assumes the open position unless the electromagnet is sufficiently energized. FIG. 1 illustrates a view in which the first cut-off valve 10.1 is in the open position.

In accordance with embodiments, the device configured to determine or ascertain the electrical resistance between components of the battery system, which components are connected in an electrically conductive manner to at least one cell 8 and a reference potential B that is galvanically separated from the cells 8 is described hereinunder. The positive path 2.1 and the negative path 2.2 of the high voltage current circuit 2 are connected in an electrically conductive manner to the load resistance 5 by way of the first separating device 3 and the second separating device 4. The positive path 2.1 comprises a first insulation resistance RISO+ and a first (parasitic) capacitance CY+ and the positive path is galvanically separated with respect to the reference potential B that is, for example, the earth potential of the vehicle. The negative path 2.2 likewise comprises a second insulation resistance RISO− and a second (parasitic) capacitance CY− and the negative path is galvanically separated with respect to the reference potential B that is for example the earth potential of the vehicle. A reference resistance R0 having a known resistance value may be switched by way of a first switch SISO+ and a second switch SISO− as desired to the positive path 2.1 or to the negative path 2.2 of the high voltage current circuit 2. The first switch and the second switch SISO+ and SISO− may be configured, for example, as transistors, and thus, may be switched by way of a control device. The control device may be, for example, an electronic unit 13. The lines for controlling the first and the second switch SISO+ and SISO− are not illustrated for the sake of clarity. The voltage that is prevailing between the positive path 2.1 and the reference potential B is measured by way of a first voltage measurement UISO+. The voltage that is prevailing between the negative path 2.2 and the reference potential B is measured by way of a second voltage measurement UISO−. The voltage that is prevailing between the positive path 2.1 and the negative path 2.2 is measured by way of a third voltage measurement UBAT.

In order to ascertain an insulation resistance RISO, the known reference resistance R0 is switched alternately in parallel to the first insulation resistance RISO+ and the second insulation resistance RISO−. After the first capacitance CY+ and the second capacitance CY− have been charge-reversed, the voltage that is prevailing between the positive path 2.1 and the reference potential B is measured by way of the first voltage measurement UISO+ and the voltage that is prevailing between the negative path 2.2 and the reference potential B is measured by way of the second voltage measurement UISO−. The insulation resistance RISO may be calculated after the resistance value R0 has been switched once to the positive path 2.1 and to the negative path 2.2. The insulation resistance RISO is obtained from the parallel connection of the first and the second insulation resistance RISO+ and RISO−.

A first signal line 7.1 leads from the first voltage measurement UISO+ to an electronic unit 13. A third signal line 7.3 likewise leads from the second voltage measurement UISO− and a second signal line 7.2 leads from the third voltage measurement UBAT to the electronic unit 13. With the aid of the signals that are transmitted by the signal lines 7.1, 7.2 and 7.3, the electronic unit 13 ascertains the actual value of the insulation resistance RISO, and compares the actual value with a limit value RISOmin. If the actual value of the insulation resistance RISO is below the limit value RISOmin, then the electronic unit is configured in such a manner as to transmit a signal that effects an actuation of the first cut-off valve 10.1 from an open position into a closed position.

Figure 2:
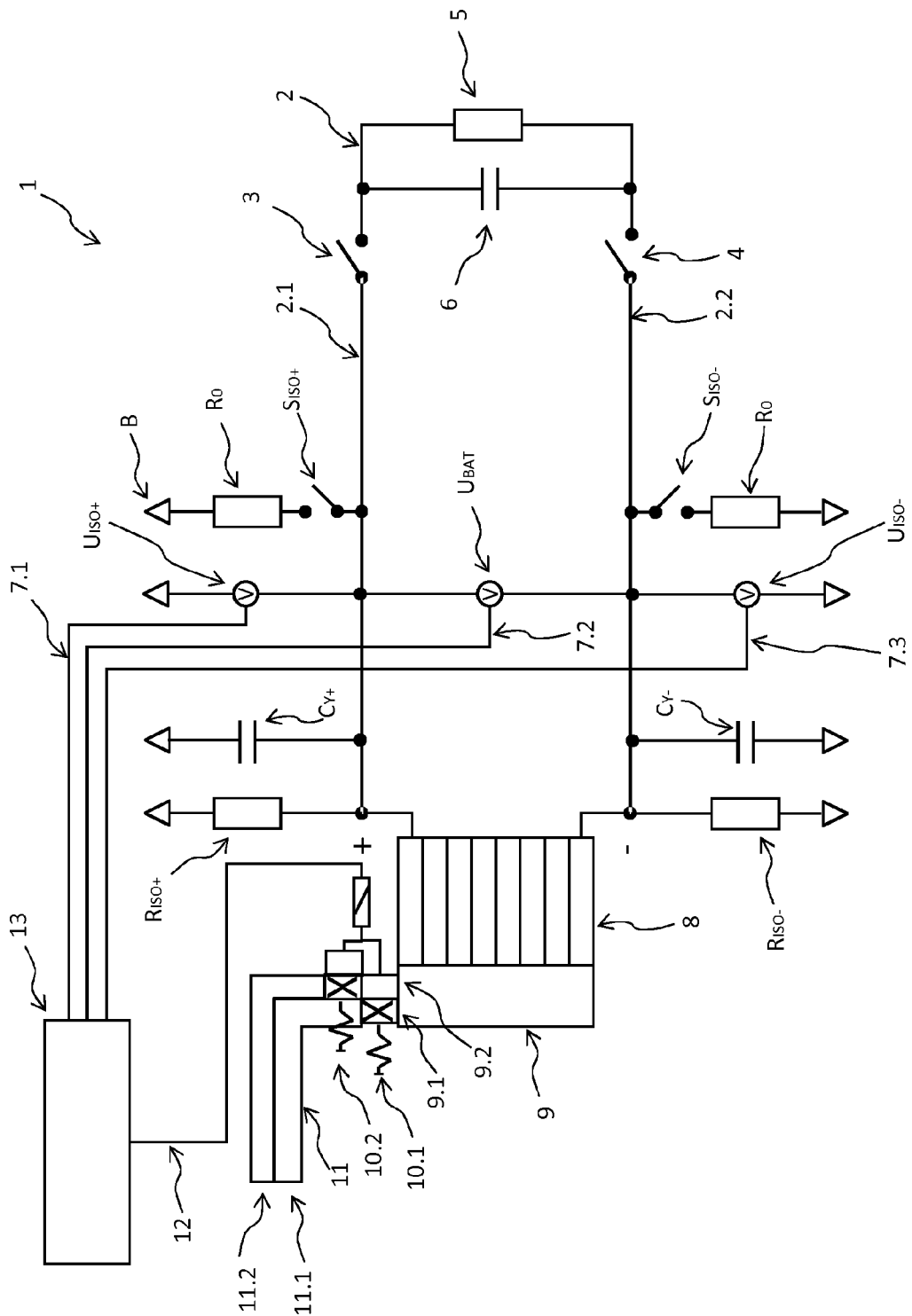
FIG. 2 illustrates a view of a safety device in accordance with embodiments.

As illustrated in FIG. 2, embodiments include a safety device 1 having a first cut-off valve 10.1 and a second cut-off valve 10.2. The first cut-off valve 10.1 may be arranged between the feed flow connection 11.1 and the heat transfer medium inlet 9.1 of the cooling body 9, and the second cut-off valve 10.2 is arranged between the return flow connection 11.2 and the heat transfer medium outlet 9.2. Both the first cut-off valve 10.1 and also the second cut-off valve 10.2 are illustrated in FIG. 2 in the closed position. The cooling body 9 may be configured in such a manner that the heat transfer medium inlet 9.1 and the heat transfer medium outlet 9.2 are arranged in spatial proximity to each other. In particular, the heat transfer medium inlet 9.1 and the heat transfer medium outlet 9.2 are located at an end of the cooling body 9. A first and a second cut-off valve 10.1, 10.2 comprise a common actuating device in the form of an electromagnet. Alternatively thereto, an embodiment that has separate actuating devices is also feasible or also an embodiment that has the heat transfer medium inlet 9.1 and the heat transfer medium outlet 9.2 at opposite ends of the cooling body 9.

The first cut-off valve 10.1 and the second cut-off valve 10.2 are arranged in the region of the heat transfer medium inlet 9.1 and/or the heat transfer medium outlet 9.2. The term "in the region of" is understood to mean that the first and the second cut-off valve 10.1, 10.2 are arranged so close to the transfer medium inlet 9.1 and/or the heat transfer medium outlet 9.2 that they may be fastened directly to the cooling body 9 or they may be fastened at the corresponding interface of the circular flow 11 to the cooling body 9. It is possible to provide for this purpose by way of example a corresponding flange on the cooling body 9, or also to provide a clamping arrangement between the first and the second cut-off valve 10.1, 10.2 and the cooling body 9.

Figure 3:
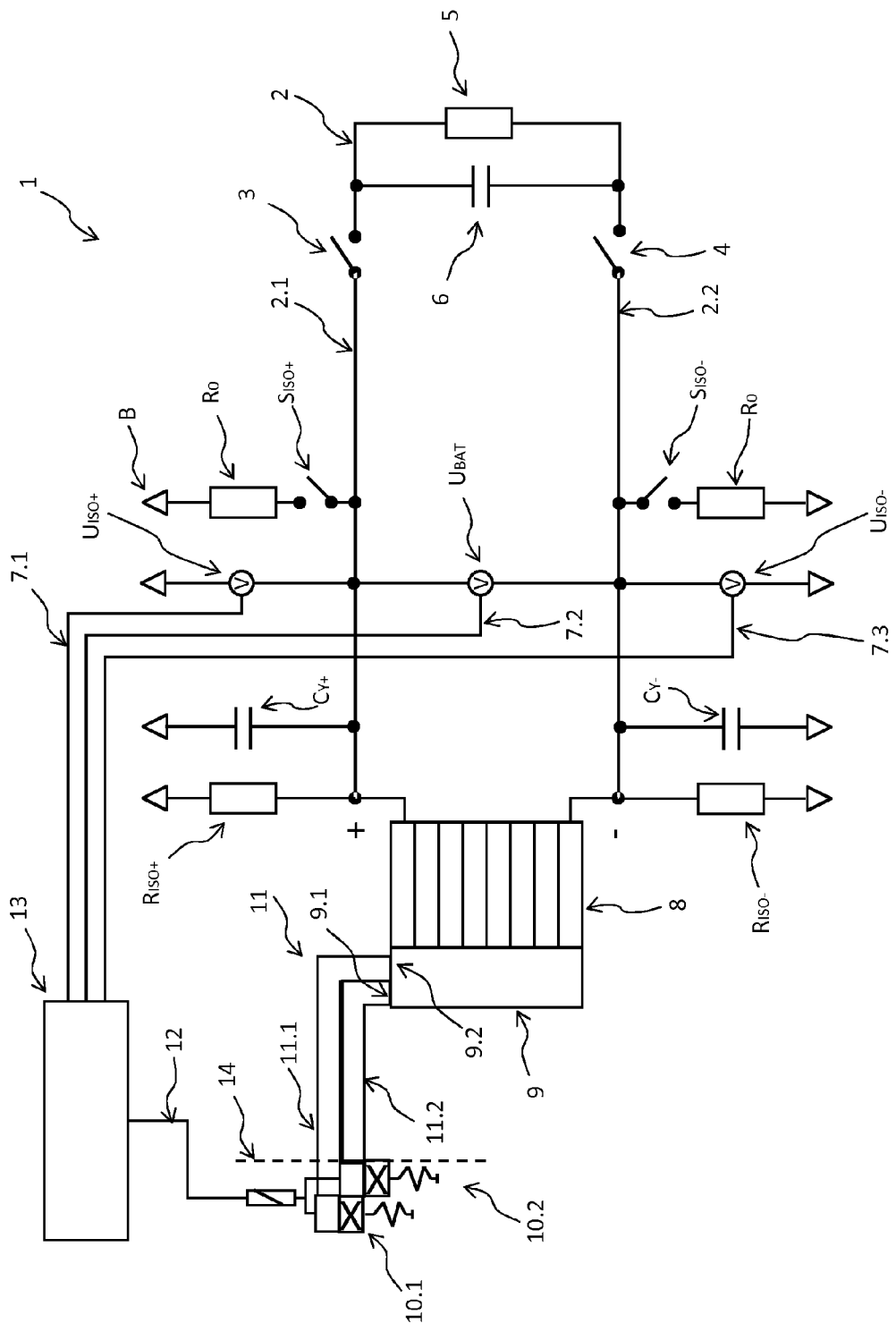
FIG. 3 illustrates a view of a safety device in accordance with embodiments.

As illustrated in FIG. 3, a safety device 1 includes a first cut-off valve 10.1 arranged in the region of the feed flow connection 11.1, and a second cut-off valve 10.2 is arranged in the region of the return flow connection 11.2. Both the first cut-off valve 10.1 and also the second cut-off valve 10.2 are illustrated in the open position. The term "in the region of" is understood to mean that the first and the second cut-off valve 10.1, 10.2 are arranged so close to the feed flow connection 11.1 and/or the return flow connection 11.2 that they may be fastened directly to the corresponding interface of the circular flow 11.

The feed flow connection 11.1 and the return flow connection 11.2 lie in spatial proximity to each other. The first and the second cut-off valve 10.1, 10.2 comprise a common actuating device in the form of an electromagnet. It is also feasible to arrange the first and second cut-off valve 10.1, 10.2 separately and likewise to provide separate actuating devices.

The first and the second cut-off valve 10.1, 10.2 are arranged outside a section of the outer housing 14. If a leak occurs in the region of the feed flow connection 11.1 or in the region of the return flow connection 11.2, then this arrangement prevents the heat transfer medium from passing into the interior of the outer housing 14 as a result of the leak.

Figure 4:
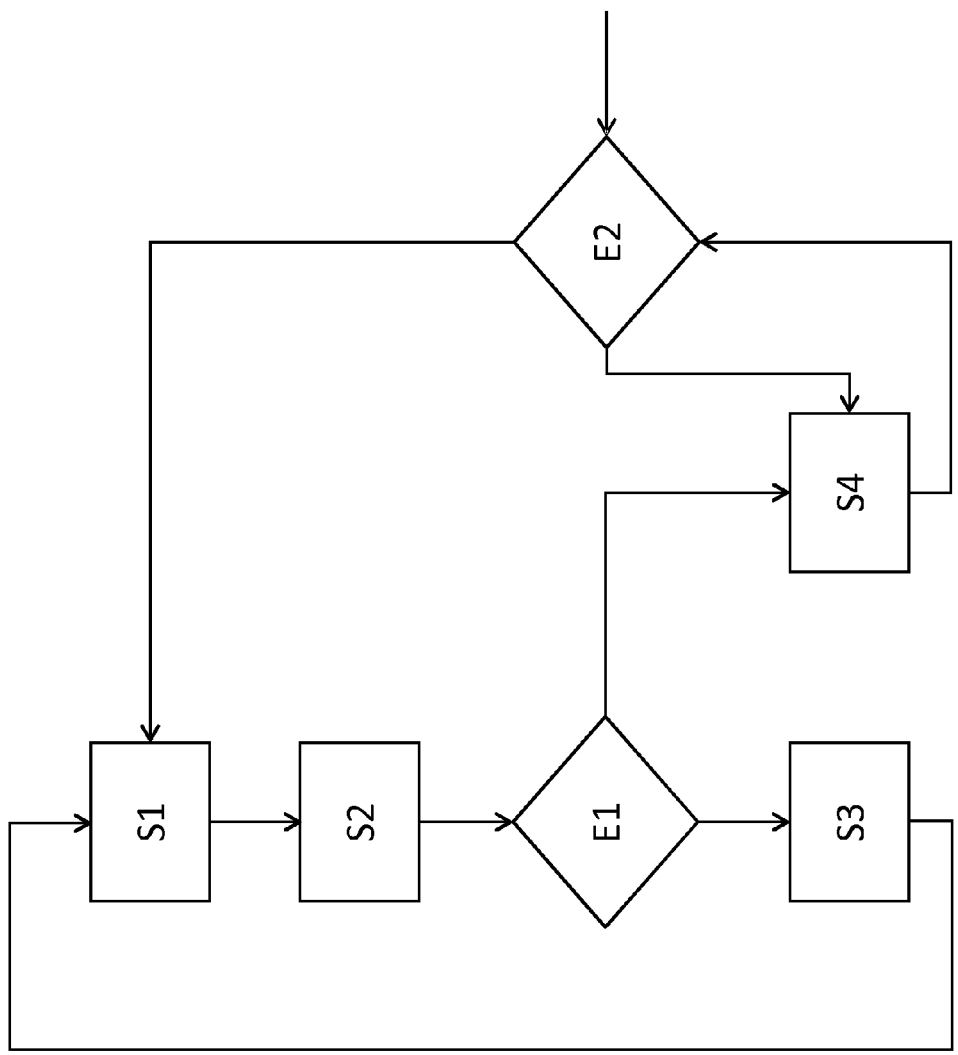
FIG. 4 illustrates a chart of a method in accordance with methods.

As illustrated in FIG. 4, a method in accordance with embodiments includes, at S1, measuring or otherwise detecting an insulation resistance RISO. This measurement may be performed at a predetermined time intervals or frequency such as, for example, every 100 ms. The insulation resistance RISO that is ascertained in step S1 is then compared with a predetermined limit value RISOmin in a second step S2. The comparison indicates either that the ascertained insulation resistance RISO is greater than or smaller than the limit value RISOmin.

The difference in magnitude between the insulation resistance RISO and the limit value RISOmin forms the basis for the subsequent decision E1. If the insulation resistance RISO is greater than the limit value RISOmin, then a third step S3 is initiated. During the third step S3, a first and/or a second cut-off valve 10.1, 10.2 is energized to such an extent that it either assumes the open position or maintains the open position. The method subsequently returns to the first step S1.

If the insulation resistance RISO is below the limit value RISOmin, then a fourth step S4 is initiated. During the fourth step S4, the first and/or the second cut-off valve 10.1, 10.2 is energized to such an extent that it assumes the closed position or maintains the closed position. If the first and/or the second cut-off valve 10.1, 10.2 is configured in such a manner that it automatically assumes the closed position without being energized, then any hitherto prevailing energizing process is terminated.

Various causes may be the reason that the insulation resistance is below the limit value RISOmin; a leak of the heat transfer medium is only one possible cause. A second decision E2 is provided in order to reinstate the mode of operation of the method even after eliminating the cause of the insulation resistance being below the limit value RISOmin. The second decision E2 may be influenced by external parameters, for example, by way of diagnostic testing during a maintenance operation. If the corresponding external parameters are not set, then the device remains in the mode that is set during the fourth step S4.

The term "coupled" or "connected" may be used herein to refer to any type of relationship, direct or indirect, between the components in question, and may apply to electrical, mechanical, fluid, optical, electromagnetic, electromechanical or other connections. In addition, the terms "first," "second," etc. are used herein only to facilitate discussion, and carry no particular temporal or chronological significance unless otherwise indicated.

Those skilled in the art will appreciate from the foregoing description that the broad techniques of the embodiments may be implemented in a variety of forms. Therefore, while the embodiments have been described in connection with particular examples thereof, the true scope of the embodiments should not be so limited since other modifications will become apparent to the skilled practitioner upon a study of the drawings, specification, and following claims.

LIST OF REFERENCE SIGNS

1 Safety device
2 High voltage current circuit
2.1 Positive path
2.2 Negative path
3 First separating device
4 Second separating device
5 Load resistance
6 Load capacitance
7.1 First signal line
7.2 Second signal line
7.3 Third signal line
8 Cells
9 Cooling body
9.1 Heat transfer medium inlet
9.2 Heat transfer medium outlet
10.1 First cut-off valve
10.2 Second cut-off valve
11 Circular flow
11.1 Feed flow connection
11.2 Return flow connection
12 Signal line of the cut-off valve
13 Electronic unit
14 Outer housing
R0 Measuring resistance
S Closing direction
K2 Opening direction
SISO+ First switch
SISO− Second switch
UISO+ First voltage measurement
UISO− Second voltage measurement
UBAT Third voltage measurement
CY+ First capacitance
CY− Second capacitance
RISO Insulation resistance
RISO+ First insulation resistance
RISO− Second insulation resistance
RISOmin Limit value
B Reference potential
S1 First step
S2 Second step
S3 Third step
S4 Fourth step
E1 First decision
E2 Second decision

What is claimed is:

1. A safety device for a vehicle having a battery system with a plurality of battery cells, the safety device comprising:

an electronic unit;
a first device configured to detect an insulation resistance between components of a battery system and a reference potential, the components of the battery system being connected in an electrically conductive manner to at least one of the battery cells;
a reference resistance between the components of the battery system and the reference potential;
a switch electrically coupled between the reference resistance and the components of the battery system;
a second device configured to supply or discharge heat to or from the battery cells via a heat transfer medium which circulates in at least one circular flow pattern; and
at least a first cut-off valve arranged in the circular flow pattern and configured to be actuated by the electronic unit,
wherein, when the detected insulation resistance is below a predetermined limit value, the first cut-off valve is actuated by the electronic unit to interrupt the circular flow pattern of the heat transfer medium.

2. The safety device of claim 1, wherein the circular flow pattern is an open circular flow pattern having a feed flow connection and a return flow connection.

3. The safety device of claim 2, further comprising a second cut-off valve,
wherein the first cut-off valve and the second cut-off valve are arranged between the feed flow connection and the return flow connection of the circular flow pattern.

4. The safety device of claim 3, wherein at least one of the first cut-off valve and the second cut-off valve is arranged inside a section of the circular flow pattern adjacent to the battery system.

5. The safety device of claim 3, wherein the second device comprises a cooling body having a heat transfer medium inlet and a heat transfer medium outlet.

6. The safety device of claim 5, wherein the first cut-off valve is arranged adjacent to the heat transfer medium inlet and the second cut-off valve is arranged adjacent to the heat transfer medium outlet.

7. The safety device of claim 3, wherein the first cut-off valve and the second cut-off valve each comprises an actuating device.

8. The safety device of claim 3, wherein the first cut-off valve is arranged adjacent to the feed flow connection and the second cut-off valve is arranged adjacent to the return flow connection.

9. The safety device of claim 3, wherein at least one of the first cut-off valve and the second cut-off valve is arranged outside a section of an outer housing.

10. The safety device of claim 3, wherein at least one of the first cut-off valve and the second cut-off valve comprises an electromagnetic actuating device configured to automatically assume a closed position when a mean magnitude of the current flowing through the electromagnetic actuating device is below a predetermined limit value.

11. The safety device of claim 1, wherein the first device comprises a component of the electronic unit.

12. The safety device of claim 1, wherein the heat transfer medium comprises a liquid heat transfer medium.

13. The safety device of claim 12, wherein the heat transfer medium comprises a water-glycol mixture.

14. A system comprising:
a battery system including a plurality of battery cells; and
a safety device for the battery system, the safety device including:
an electronic unit;
a first device configured to detect an insulation resistance between components of the battery system and a reference potential, the components of the battery system being connected in an electrically conductive manner to at least one of the battery cells;
a reference resistance between the components of the battery system and the reference potential;
a switch electrically coupled between the reference resistance and the components of the battery system;
a second device configured to supply or discharge heat to or from the battery cells via a heat transfer medium which circulates in at least one circular flow pattern; and
at least a first cut-off valve arranged in the circular flow pattern of the heat transfer medium and configured to be actuated by the electronic unit,
wherein, when the detected insulation resistance is below a predetermined limit value, the first cut-off valve is actuated by the electronic unit to interrupt the circular flow pattern of the heat transfer medium.

15. The system of claim 14, further comprising a second cut-off valve,
wherein the first cut-off valve and the second cut-off valve are arranged between a feed flow connection and a return flow connection of the circular flow pattern.

16. The system of claim 14, wherein the second device comprises a cooling body having a heat transfer medium inlet and a heat transfer medium outlet.

17. The system of claim 15, wherein at least one of the first cut-off valve and the second cut-off valve comprises an electromagnetic actuating device configured to automatically assume a closed position when a mean magnitude of the current flowing through the electromagnetic actuating device is below a predetermined limit value.

18. The system of claim 14, wherein the first device comprises a component of the electronic unit.

\* \* \* \* \*